Patented Sept. 29, 1936

2,055,727

UNITED STATES PATENT OFFICE 2,055,727

METHOD FOR THE PRODUCTION OF SULPHUR-CONTAINING ABIETYL COMPOUNDS

Emil Ott, Elsmere, Del., assignor to Hercules Powder Company, Wilmington, Del., a corporation of Delaware No Drawing. Application June 7, 1935, Serial No. 25,428. Renewed February 19, 1936

14 Claims.  (Cl. 260—17)

This invention relates to the production of sulphur-containing abietyl compounds, and more particularly to the production of such compounds from halogenated abietyl compounds.

In application Serial No. 712,753, filed February 24, 1934, by me jointly with Joseph N. Borglin, there is disclosed a method for the production of sulphur-containing abietyl compounds involving the direct addition of hydrogen sulphide to unsaturated abietyl compounds. By such methods, however, it is not possible to produce sulphur-containing abietyl compounds from saturated abietyl compounds, nor can certain types of sulphur-containing abietyl compounds be produced.

Now in accordance with this invention a halogenated abietyl compound, as a fluorine, chlorine, bromine or iodine addition or substitution product of an abietyl compound, as, for example, abietic acid or rosin, abietic acid esters, as methyl, ethyl, glycol, glyceryl abietates, etc.; abietyl alcohol; abietyl alcohol esters, as, abietyl acetate, abietyl abietate, etc.; abietene; and hydrogenated abietic acid or rosin, hydrogenated abietic acid esters, hydrogenated abietyl alcohol, hydrogenated abietyl alcohol esters, hydrogenated abietene, retene, rosin oil, abietyl-sulphur compounds or other abietyl derivatives, etc., is reacted with an organic or inorganic compound containing the group $-S_nM$, where M is a metal, the ammonia group or hydrogen, and $n$ is 1 or more.

Halogen addition or substitution products of abietyl compounds are all well known and are usually prepared by direct treatment of the desired abietyl compound with the halogen or with a hydrogen halide. Chlorine and bromine are the halogens usually employed. They may also be produced by the use of sulphur halides, acid halides, etc.

Any compound containing the group $-S_nM$, as above defined, may be employed in the method in accordance with this invention, as for example, hydrogen sulphide; metal hydrosulphides, as sodium, potassium hydrosulphides, etc.; metal sulphides, as sodium, potassium, calcium, barium sulphides, etc.; metal polysulphides, as sodium polysulphide, metal thiocyanates etc.; organic compounds containing the —SH group, as, for example, mercaptans, as ethyl, benzyl, pinene mercaptans, thiophenol, mercapto-abietic acid, etc.; thio-acids; xanthates; trithiocarbonates; etc.; organic compounds containing the —SM group, where M is a metal, as, for example, mercaptides, as sodium amyl mercaptide, potassium thiophenolate, sodium dipentene mercaptide, etc.

The halogenated abietyl compound and the sulphur compound of the type described may be reacted in any proportion, depending on the molecular composition of the products to be reacted, and the product desired, and also on the relative cost of reagents, altho where optimum reaction rates and yields are desired, a ratio of from about 1 part to about 5 parts by weight of sulphur compound per part of halogenated abietyl compound is to be preferred. The reaction will preferably be carried out at an elevated temperature in order to secure a practical reaction rate, however, the reaction occurs at a temperature of from about 0° C. up to the decomposition temperature of the reactants.  A temperature of from about 60° C. to about 110° C. is very satisfactory.  Pressure conditions have slight effect upon the reaction, except where hydrogen sulphide is employed, in which case superatmospheric pressure may be employed to advantage.

The sulphur compound, if solid, will preferably be dissolved in an organic solvent therefor, as, for example, ethyl alcohol, methyl alcohol, acetone, etc., or even in water, or in mixtures of such solvents, depending on its solubility. The halogenated abietyl compounds, if liquids, will ordinarily be used in such form in the reaction, and the solvent selected for the sulphur compound will preferably be miscible with the halogenated abietyl compound. If the halogenated abietyl compound is solid, it will desirably be dissolved, either in the same solvent as that used for the sulphur compound or in a solvent miscible with such solvent. When the sulphur compound employed is hydrogen sulphide, the hydrogen sulphide will desirably be bubbled through the halogenated abietyl compound which if not a liquid, will be in solution.

After the completion of the reaction, which will usually take from about ¼ to about 30 hours, depending upon the particular conditions of reaction employed, the sulphur-containing abietyl compound may be recovered from the reaction mixture, for example, by extracting the latter, preferably after acidification, with a solvent for the reaction product which is a non-solvent for the unreacted sulphur compound and like impurities, as, for example, with carbon tetrachloride, benzene, gasoline, etc., or by a variety of other methods, obvious to those skilled in the art, depending on the chemical and physical nature of the particular reaction mixture. A preliminary extraction of the non-acidified reaction mixture will remove most of the unreacted halogenated abietyl compound, together with some partially sulphurized material. The extracted sulphur-containing abietyl compound may, in most instances, be further refined by distillation, preferably in vacuo.

Diverse types of sulphur-containing abietyl compounds may be produced in accordance with this invention. Thus, for example, and depending upon the type of sulphur compound employed, abietyl mercaptans or thioalcohols; abietyl sulphides or thioethers; mixed abietyl and alkyl, aryl or aralkyl thioethers; abietyl di- or polysulphides; abietyl thioacids or derivatives thereof; etc., may be formed.

If desired, the halogenated abietyl compound may be admixed with other organic halogen compounds, and the resultant mixture treated with a sulphur compound of the type described in accordance with this invention.

When hydrogen sulphide is to be used as the sulphur compound in accordance with this invention, it is not necessary to first halogenate an abietyl compound and then react the halogenated compound with the hydrogen sulphide. If desired, the two reactions may proceed simultaneously. Thus, an abietyl compound may be treated in accordance with this invention simultaneously with a halogen and with hydrogen sulphide.

The following examples are illustrative of practical procedure in accordance with this invention:

Example I

To 30 g. of tetrachlorabietic acid (34% $Cl_2$) were added 22.5 g. of 44.4% sodium amyl mercaptide in alcohol-water solution. Upon refluxing salt was precipitated. 50 cc. of alcohol were added and the refluxing continued five hours and the mixture was cooled. Benzene, water and acetic acid were added to the mixture and the mixture well stirred. The aqueous solution was decanted and the benzene solution water washed. By evaporation of the benzene solution a product was recovered which analyzed as follows:

|  | Per cent |
|---|---|
| $Cl_2$ | 15 |
| S | 6.8 |

24 g. of the above product were retreated by refluxing five hours with 75 g. of 44.4% sodium amyl mercaptide solution. The solution was diluted, acidified with acetic acid and extracted with benzene. The recovered product analyzed:

|  | Per cent |
|---|---|
| S | 10.4 |
| $Cl_2$ | 5.5 |

Example II 60 g. chlorinated rosin (11.9% $Cl_2$) were refluxed 5 hours with 850 g. of an alcoholic solution of sodium polysulphide. The alcohol was evaporated and refluxing continued 6 additional hours. The reaction mass was extracted with carbon tetrachloride solution after acidification with acetic acid. The carbon tetrachloride solution was evaporated and a product recovered which analyzed as follows:

| Acid number | 123 |
|---|---|
| $Cl_2$ | 10 % |
| S | 2.2% |

Example III 20 g. chlorinated dihydro abietyl alcohol, 44 g. sodium amyl mercaptide, 30 g. alcohol and 10 g. water were refluxed twelve hours. 100 cc. of benzene were added, and the mixture was diluted with water and acidified with acetic acid. The benzene solution was then water washed and evaporated for recovery of the product.

Example IV 10 g. of chlorinated rosin (37% $Cl_2$) and 52 cc. of an alcoholic KSH solution, containing 10 g. of KSH, were refluxed for about six hours and then cooled. During the refluxing treatment a considerable proportion of the reaction product separates from the solution, and more separated as the reaction mixture was cooled down. The reaction mixture was then filtered to separate the precipitated product. The remainder of the reaction product contained in the filtrate was then precipitated by the addition of water and removed by filtrate. The precipitates were then combined and washed with water, until the wash water no longer showed an alkaline reaction. The recovered product analyzed as follows:

|  | Per cent |
|---|---|
| $Cl_2$ | 8.6 |
| S | 6.22 |

Example V 5 g. of chlorinated rosin (37% $Cl_2$), 10 g. of aqueous $NH_4SH$ solution (3.3 g. $NH_4SH$) and 150 cc. of alcohol were refluxed for about four hours. The reaction product was recovered as described in Example IV. The recovered product analyzed as follows:

S ---------------------------------------- 4.72%

Example VI

To 10 g. of chlorinated rosin dissolved in benzene were added 1.5 g. of anhydrous aluminum chloride. Hydrogen sulphide was then passed through this mixture for about one-half hour, while being cooled with ice water. The reaction mixture was then slowly warmed to 65° C. in a closed vessel, and maintained at that temperature for about two hours. The reaction mixture was then washed with water, dilute hydrochloric acid, and again with water. It was then thoroughly dried to remove the water. The reaction product was then recovered by evaporating the benzene. This product analyzed as follows:

S ---------------------------------------- 0.42%

Example VII 50 cc. of alcoholic pinene mercaptide was made by reacting 15 cc. of caustic extracted pinene mercaptan (14% S.) with the theoretical amount of KOH in alcohol. To this was added 3 g. of chlorinated rosin (37% $Cl_2$) and about 15 cc. of benzene. This mixture was then heated on a steam bath for about two hours. The potassium chloride which precipitated out was then filtered out of the reaction mixture, and most of the solvent evaporated. The product was then dissolved in ether and washed several times with a 5% caustic solution to remove any unreacted mercaptan. The final product recovered by the evaporation of ether analyzed as follows:

S ---------------------------------------- 12.2%

Example VIII 3 g. of chlorinated rosin (34% $Cl_2$), 3 cc. of ethyl mercaptan, 1 g. of anhydrous $AlCl_3$, and 25 cc. of benzene were thoroughly mixed and then allowed to stand for about 16 hours. The reaction was then washed with water and dilute hydrochloric acid until entirely free of aluminum chloride. The reaction product was then recovered by evaporating the unreacted ethyl mercaptan and the benzene. The product gave a negative test for mercaptans, but a positive test for sulphur.

It will be understood that the details and examples hereinbefore set forth are illustrative only, and do not in any way limit the invention as herein broadly described and claimed.

Abietyl compounds, as the term is used in this specification and in the claims hereinafter set forth, are defined as compounds whose nucleus contains the carbon skeleton of the hydrocarbon nucleus of abietic acid.

What I claim and desire to protect by Letters Patent is:

1. The method of producing a sulphur-containing abietyl product which includes reacting a halogenated abietyl compound with a reactive, soluble compound containing the group —$S_nM$, where M is a metal, the ammonium group or hydrogen and $n$ is 1 or more.

2. The method of producing a sulphur-containing abietyl product which includes reacting a halogenated abietyl compound with a reactive, soluble compound containing the group —$S_nM$, where M is a metal and $n$ is 1 or more.

3. The method of producing a sulphur-containing abietyl product which includes reacting a halogenated abietyl compound with a reactive, soluble inorganic compound containing the group —$S_nM$, where M is a metal, the ammonium group or hydrogen and $n$ is 1 or more.

4. The method of producing a sulphur-containing abietyl product which includes reacting a halogenated abietyl compound with a reactive, soluble organic compound containing the group —$S_nM$, where M is a metal, the ammonium group or hydrogen and $n$ is 1 or more.

5. The method of producing a sulphur-containing abietyl product which includes reacting a halogenated abietyl compound with hydrogen sulphide.

6. The method of producing a sulphur-containing abietyl product which includes reacting at a temperature of from about 60° C. to about 110° C. a halogenated abietyl compound with a reactive, soluble compound containing the group —$S_nM$, where M is a metal, the ammonium group or hydrogen and $n$ is 1 or more.

7. The method of producing a sulphur-containing abietyl product which includes reacting a halogenated abietic acid ester with a reactive, soluble compound containing the group —$S_nM$, where M is a metal, the ammonium group or hydrogen and $n$ is 1 or more.

8. The method of producing a sulphur-containing abietyl product which includes reacting a halogenated abietyl alcohol with a reactive, soluble compound containing the group —$S_nM$, where M is a metal, the ammonium group or hydrogen and $n$ is 1 or more.

9. The method of producing a sulphur-containing abietyl product which includes reacting halogenated abietic acid with a reactive, soluble compound containing the group —$S_nM$, where M is a metal, the ammonium group or hydrogen and $n$ is 1 or more.

10. The method of producing a sulphur-containing abietyl product which includes simultaneously reacting an abietyl compound with a halogen and hydrogen sulphide.

11. The method of producing a sulphur-containing abietyl product which includes reacting a halogenated abietyl compound with a reactive, soluble compound containing the group —$S_nM$, where M is a metal, the ammonium group or hydrogen and $n$ is 1 or more, and separating the sulphur-containing abietyl product from the reaction mixture.

12. The method of producing a sulphur-containing abietyl product which includes reacting a halogenated abietyl compound with a reactive, soluble compound containing the group —$S_nM$, where M is a metal, the ammonium group or hydrogen and $n$ is 1 or more, and extracting the sulphur-containing abietyl product from the reaction mixture with a solvent therefor.

13. The method of producing a sulphur containing abietyl compound which includes reacting a halogenated abietyl compound with an alkali metal mono-sulphide.

14. The method of producing a sulphur containing abietyl product which includes reacting a halogenated abietyl compound with a water-soluble inorganic sulphide.

EMIL OTT.